Patented Apr. 19, 1949

2,467,904

UNITED STATES PATENT OFFICE 2,467,904

EXTRACTION OF SESAMIN

Allen L. Omohundro, Wilton, and Emil C. Fanto, Fairfield, Conn., and Irving Reich, Brooklyn, N. Y., assignors to McKesson & Robbins, Incorporated, Bridgeport, Conn., a corporation of Maryland No Drawing. Original application July 20, 1945, Serial No. 606,280. Divided and this application February 7, 1947, Serial No. 727,280

8 Claims. (Cl. 260—345)

This invention relates to the extraction of sesamin concentrates from sesamin-bearing substances such as sesame oil and sesame seed. This application is a continuation-in-part of our application Serial No. 550,308, filed August 19, 1944, and a division of our application Serial No. 606,280, filed July 20, 1945.

Recent discoveries regarding the synergistic effect of sesamin in enhancing the activity of pyrethrins in insecticides make a cheap, convenient method of separating sesamin from sesame oil very desirable.

Sesamin is a compound having a common nucleus composed of 2 fused dihydrofuran rings with a substituted pyrocathechin group attached symmetrically to each of one of the carbon atoms adjacent to the ether oxygen atoms; R and R' representing $O_2CH_2$ (methylendioxyl).

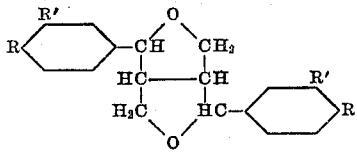

We have devised a method for accomplishing this extraction which has the following advantages:

The process does not very appreciably affect the composition or the commercial value of the sesame oil. We extract 1 to 5% of sesamin concentrate, and the remaining 95 to 99% of the oil is practically unharmed.

It involves practically no consumption of raw materials. The oil and the extracting solvents are both recovered.

Our method consists in the extraction of the commercially available sesame oil with acetone and water. The following example will illustrate our method of processing: One volume of oil is extracted by stirring at 50–55° C. with two volumes of acetone which has been diluted with 35 to 55% by volume of water. The mixture separates into two layers. The upper oily layer is syphoned off. The lower acetone water layer having the sesamin in solution is freed from acetone and water by distillation, leaving a residual concentrate or extract which contains 20–40% sesamin depending on the sesamin content of the original oil.

For further purification of the sesamin extract, the sesamin extract after having been substantially freed from acetone and water, is treated with a low boiling petroleum, as will be described.

By the use of acetone, sesamin concentrate may be extracted from crushed sesame seed. The crushed seed is extracted or percolated with the acetone and water mixture, and the percolate distilled to drive off the acetone and leave behind the sesamin concentrate. The following example will illustrate our method.

The crushed seed is placed in an extractor, percolator or analogous apparatus, is moistened with acetone and tamped down. Then acetone containing 35–55% of water is poured at a temperature of 50–55° C. over the crushed seed in the ratio of one gallon of diluted acetone for each 3 lbs. of seed. The percolate is distilled to drive off the acetone and water, to leave a sesamin concentrate.

As another feature of the invention covered in copending application Serial No. 606,280, the sesamin extract, as obtained from the process described above, is further purified and concentrated by treatment with a low boiling petroleum fraction. The petroleum distillate or cut used is desirably petroleum ether having a boiling range of 50°–70° C. Although petroleum ether is highly desirable for the purpose, it has been found that in general, petroleum distillates of a specific gravity of about .700 to .800 at 20° C. are also suitable. In particular, naphtha, lighter kerosene fractions and those petroleum fractions in the hexane and heptane range can be used.

The sesamin concentrate, which is extracted from the sesamin oil by acetone and water, and which has its solvent acetone substantially removed, is partly liquid and oily. It has been found that the solid portion of this concentrate is mostly sesamin, and is practically insoluble in petroleum distillate, such as the petroleum ether described. The oily liquid portion of the concentrate contains much less sesamin, and is soluble in petroleum ether, so that the treatment with petroleum ether affords an effective method of separating and concentrating the solid material from the only material. After the sesamin concentrate has been treated with the petroleum distillate as described, the undissolved solid material is dried, and can be used in conjunction with pyrethrin to form a highly effective insecticide.

As a specific example of the process of the present invention, 100 pounds of sesamin concentrate made by extraction with acetone as described above, after being substantially freed from the acetone solvent, is mixed thoroughly with 90 gallons of petroleum ether in a closed vessel equipped with a stirrer. After these substances have been thoroughly mixed through operation of the stirrer, the mixture is permitted to stand, so that the insoluble solid material settles out. The mixture is then filtered through a filtering system containing plates or chambers, where the solid material insoluble in petroleum ether is collected and washed with petroleum ether. The solid material is then dried.

Besides its improved synergistic activity, the solid residue obtained by the process of the present invention represents a very desirable, economical form of sesamin for handling, shipping, storing, exporting and using with powders in powder sprayers.

While the invention has been described with particular reference to a specific embodiment, it is to be understood that it is not to be limited thereto but is to be construed broadly and restricted solely by the scope of the appended claims.

What is claimed is:

1. The method of extracting sesamin from sesamin oil or sesamin seed which includes dissolving the sesamin out of the oil or seed by treating with a solution of acetone in 35 to 55% water.

2. The method of extracting sesamin from sesamin oil or sesamin seed, including treating said oil or seed with a solution of acetone in 35 to 55% water to dissolve the sesamin therein in preference to the bulk of the oils in said sesamin oil or seed.

3. The method of extracting sesamin from sesamin oil or sesamin seed as described in claim 2, in which said oil or seed is treated with a solution of acetone in 35 to 55% water at a temperature of 50 to 55° C.

4. The method of extracting sesamin from sesamin oil or sesamin seed, including treating said oil or seed with a solution of acetone in 35 to 55% water to dissolve the sesamin therein, withdrawing the acetone water solution, and recovering the acetone.

5. The method of extracting sesamin from sesamin oil or sesamin seed, including treating said oil or seed with a solution of acetone in water to dissolve therein the sesamin in preference to the bulk of the oils in said sesamin oil or seed, permitting the sesamin acetone solution and the residue oil to separate into two layers and separating the sesamin acetone water solution layer from the residue oil layer.

6. The method of extracting sesamin from sesamin oil or sesamin seed as described in claim 5, in which the acetone and water is removed from the sesamin acetone solution by distillation.

7. The method of extracting sesamin from sesamin oil or sesamin seed, as described in claim 5, in which the treatment of the sesamin oil or seed with the solution of the acetone and water is effected at 50–55° C., and in which the acetone and water is removed from the sesamin acetone solution.

8. The method of extracting sesamin from sesamin oil or sesamin seed, as described in claim 5, in which the sesamin oil or seed is treated with a water solution of acetone at a temperature of from 10 to 50° C.

ALLEN L. OMOHUNDRO.
EMIL C. FANTO.
IRVING REICH.

REFERENCES CITED

The following references are of record in the file of this patent:

UNITED STATES PATENTS

| Number | Name | Date |
| --- | --- | --- |
| 2,198,200 | Musher | Apr. 23, 1940 |

OTHER REFERENCES

Adriani, Chemical Abstracts, vol. 23, page 2054, 1929.